US012746162B2

(12) United States Patent
Konkle et al.

(10) Patent No.: US 12,746,162 B2
(45) Date of Patent: Sep. 29, 2026

(54) PATIENT POSITIONING AND TRANSFER SHEET

(71) Applicant: EHOB, Inc., Indianapolis, IN (US)

(72) Inventors: Gregory R. Konkle, Indianapolis, IN (US); Christian Gastaldo, Indianapolis, IN (US); Jared Scott Cohen, Indianapolis, IN (US); Isaac Oberhausen, Fort Wayne, IN (US)

(73) Assignee: EHOB, Inc., Indianapolis, IN (US)

( * ) Notice: Subject to any disclaimer, the term of this patent is extended or adjusted under 35 U.S.C. 154(b) by 59 days.

(21) Appl. No.: 18/902,218

(22) Filed: Sep. 30, 2024

(65) Prior Publication Data

US 2026/0090936 A1 Apr. 2, 2026

(51) Int. Cl.
*A61G 7/10* (2006.01)

(52) U.S. Cl.
CPC .................................. *A61G 7/1026* (2013.01)

(58) Field of Classification Search
CPC .. A61G 7/1025; A61G 7/1026; A47G 9/0223; A47G 9/04; A47G 9/06; A47G 9/062; B32B 3/00; B32B 3/02; B32B 3/04; B32B 3/06
USPC .......................................... 5/81.1 T; 428/192
See application file for complete search history.

(56) References Cited

U.S. PATENT DOCUMENTS

| | | | | |
|---|---|---|---|---|
| 3,829,914 A * | 8/1974 | Treat | A61G 7/1026 | 5/81.1 T |
| 4,092,748 A * | 6/1978 | Ewers | A61G 7/1074 | 5/85.1 |
| 4,097,943 A * | 7/1978 | O'Connell | A61F 13/5611 | 604/374 |
| 4,535,096 A * | 8/1985 | Jacobs | C08J 9/0014 | 521/107 |
| 5,427,834 A * | 6/1995 | Sodetz | A47G 9/062 | 428/95 |
| 5,638,558 A * | 6/1997 | Moore | A61G 7/1026 | 5/81.1 T |
| 5,901,388 A * | 5/1999 | Cowan | A61G 7/1044 | 5/81.1 HS |
| 6,728,978 B1 * | 5/2004 | Nordin | A47C 27/005 | 5/81.1 HS |
| 6,898,809 B2 | 5/2005 | Davis | | |

(Continued)

*Primary Examiner* — David R Hare
(74) *Attorney, Agent, or Firm* — Maginot, Moore & Beck, LLP

(57) ABSTRACT

A patient transfer sheet includes a core panel sized to receive at least the torso and upper legs of a patient lying thereon and a side strip extending along each of the opposite side edges. Each side strip is a single sheet side panel that is folded twice to define four layers and to overlap a side portion of the core panel adjacent a corresponding side edge, with two abutting layers of the four layers disposed on each of the top and bottom surfaces of the core panel. A plurality of handles is provided along the length of each side strip, defined by aligned openings cut through each of the layers and the side portion of the core panel. All of the plurality of layers are affixed together and to the core panel but are not affixed together or to the core panel at the aligned openings. The core panel and the side strip each include a repeating pattern of indentations that improve the strength and tear resistance of the transfer sheet.

20 Claims, 4 Drawing Sheets

(56) References Cited

U.S. PATENT DOCUMENTS

| | | | | |
|---|---|---|---|---|
| 6,911,407 | B2 * | 6/2005 | Sherrod | A47C 27/006 442/79 |
| 7,107,641 | B2 | 9/2006 | Davis | |
| 7,114,204 | B2 | 10/2006 | Patrick | |
| 7,210,176 | B2 | 5/2007 | Weedling et al. | |
| 7,243,382 | B2 | 7/2007 | Weedling et al. | |
| 7,266,852 | B2 | 9/2007 | Davis | |
| 7,373,680 | B2 | 5/2008 | Davis | |
| 7,376,995 | B2 | 5/2008 | Davis | |
| 7,415,738 | B2 | 8/2008 | Weedling et al. | |
| 7,464,422 | B2 | 12/2008 | Townsend | |
| 7,565,709 | B2 | 7/2009 | Davis | |
| 7,712,170 | B2 | 5/2010 | Davis | |
| 7,735,164 | B1 | 6/2010 | Patrick | |
| 7,739,758 | B2 | 6/2010 | Weedling et al. | |
| 7,861,335 | B2 | 1/2011 | DeLuca et al. | |
| 7,900,299 | B2 | 3/2011 | Weedling et al. | |
| 8,006,333 | B2 | 8/2011 | Genaro et al. | |
| 8,234,727 | B2 | 8/2012 | Schreiber et al. | |
| 8,276,222 | B1 | 10/2012 | Patrick | |
| 8,281,436 | B2 * | 10/2012 | Spahn | A61G 7/05784 5/81.1 HS |
| 8,387,177 | B2 | 3/2013 | Davis | |
| 8,756,725 | B2 | 6/2014 | Piegdon et al. | |
| 8,856,992 | B2 | 10/2014 | Lafleche et al. | |
| 8,887,326 | B2 | 11/2014 | Patrick | |
| 9,125,777 | B2 | 9/2015 | Patrick | |
| 9,241,580 | B2 * | 1/2016 | Patrick | A61G 7/1028 |
| 9,314,388 | B2 | 4/2016 | Patrick | |
| 9,420,895 | B2 | 8/2016 | Lafleche et al. | |
| 9,693,919 | B2 | 7/2017 | Berman | |
| 9,693,920 | B2 | 7/2017 | Fowler et al. | |
| 9,782,312 | B2 | 10/2017 | Brubaker et al. | |
| 9,849,053 | B2 | 12/2017 | Rigoni et al. | |
| 9,861,544 | B2 | 1/2018 | Rigoni et al. | |
| 10,064,773 | B2 | 9/2018 | Rigoni et al. | |
| 10,500,115 | B2 * | 12/2019 | Weedling | A61G 7/1023 |
| 10,561,556 | B2 | 2/2020 | Rigoni et al. | |
| 10,561,557 | B2 | 2/2020 | Emerson et al. | |
| 10,624,806 | B2 | 4/2020 | Emerson et al. | |
| 10,765,576 | B2 | 9/2020 | Rigoni et al. | |
| 10,828,216 | B2 | 11/2020 | Phalen et al. | |
| 10,836,002 | B2 | 11/2020 | Kennedy et al. | |
| 10,858,023 | B2 | 12/2020 | Kaidantsis et al. | |
| 10,959,549 | B2 * | 3/2021 | Rogers | B32B 5/06 |
| 10,987,267 | B2 | 4/2021 | Alvarez et al. | |
| 11,213,447 | B2 | 1/2022 | Fowler et al. | |
| 11,607,358 | B2 * | 3/2023 | Spahn | A61G 7/001 |
| 11,642,267 | B2 | 5/2023 | Kea et al. | |
| 12,023,288 | B2 | 7/2024 | Ulreich | |
| 12,064,385 | B1 | 8/2024 | Boulos et al. | |
| 12,329,704 | B2 * | 6/2025 | Fogel | A61F 13/51456 |
| 2024/0307245 | A1 | 9/2024 | Fowler et al. | |
| 2024/0325225 | A1 | 10/2024 | Rigoni et al. | |
| 2024/0342032 | A1 | 10/2024 | Ulreich | |
| 2024/0350343 | A1 | 10/2024 | Kea et al. | |
| 2024/0350345 | A1 | 10/2024 | Boulos et al. | |
| 2024/0350346 | A1 | 10/2024 | Boulos et al. | |

* cited by examiner

PATIENT POSITIONING AND TRANSFER SHEET

BACKGROUND

The present disclosure relates to devices facilitating the turning or repositioning of bedridden patients by caregivers. In particular, the disclosure relates to a sheet used as a turning or positioning device.

Without periodic turning or other repositioning relative to a support surface, a bedridden patient can develop pressure ulcers. Pressure ulcers (also known as pressure sores, bed sores, or decubitus ulcers) represent localized areas of tissue damage. Pressure ulcers often occur when the soft tissue between a bony prominence and an external surface is compressed for an extended period of time. Pressure ulcers can also occur from friction, such as by rubbing against a bed, cast, brace, or the like. Pressure ulcers commonly occur in immobilized patients who are confined to a bed, chair or wheelchair. Localized tissue ulceration results when pressure on the skin exceeds capillary filling pressure (approximately 32 mm Hg), which thereby impedes the microcirculation in the skin and the underlying subcutaneous tissue. With compromised blood flow, the delivery of oxygen and nutrients to target tissues is impaired. If blood flow is not restored promptly, the skin and subcutaneous tissue will die and a pressure ulcer will develop. Pressure ulcers can start to develop after only 20-30 minutes of immobility and pressure loading, but the effects can be resolved by turning the patient away from the particular pressure loading within an established period.

Therefore, periodic turning of a patient is routinely performed by caregivers to prevent the occurrence or lessen the severity of pressure ulcers in the patent. Typically, patient turning is performed every two hours according to a "q2 protocol", a turning regimen well-known in the relevant art. The q2 protocol is a long-standing rule of practice that requires observing, turning, assessing and attending a bedridden patient every two hours. These steps concern looking for symptoms of a developing pressure ulcer and, if necessary, treating the condition. The turning step involves physically moving the patient to a different position to relieve the pressure on the particular location. Accordingly, a patient may, for example, be moved from a first orientation flat on his/her back, to a second orientation in which his/her body is substantially oblique to the support surface i.e., on his/her side. In the second orientation, the patient's body is often supported by one or more devices, such as foam wedge members, interposed between the patient and the support surface. In subsequent repositionings, the patent will be oriented in a variety of positions to manage the pressure applied to the patient's body over what might be a lengthy time in bed. Again, the conventional protocol is to reposition every patient every two hours, day and night.

The risks to the bed-ridden patient of non-compliance with the q2 protocol can be significant. It can be appreciated that pressure ulcer prevention presents a significant workload for the nursing or caregiver staff. In addition to the time demands of maintaining the q2 protocol 2-hour schedule, repositioning a patient, particularly patients who are unable to assist, can be physically demanding. Safe Patient Handling ("SPH") standards have been developed that concern the occupational health and safety of nurses and caregivers with respect to the handling of patients, which includes the turning, repositioning, transference, or otherwise moving or supporting patients bodily. Objectives of SPH include preventing injuries to caregivers due, for example, to muscle strain, and facilitating greater ease in handling their patients.

Therefore, positioning devices are commonly used to facilitate SPH of bedridden patients. Types of positioning devices relevant to this disclosure include devices comprising a glide sheet having an upper or top side surface on which the patient lays, and an opposite, lower or bottom side surface that contacts a support surface, such as a bed mattress, support wedge(s), and/or mattress-covering sheet. The bottom side surfaces are configured to facilitate sliding movement of the glide sheet and the patient, relative to the support surface(s), by the caregiver(s) pulling the glide sheet.

In some prior positioning devices, the glide sheet top side material layer is typically polyester, and the bottom side material layer is typically polyester or rip-stop nylon, both of which are moisture permeable and breathable fabrics. The polyester top side material layer also provides some moisture wicking properties. Such prior positioning devices ordinarily facilitate convective airflow and heat transfer therethrough, particularly when the patient is obliquely positioned and supported by wedges as described above, which creates between the patient and the bed mattress an air space capable of receiving heat, air and/or moisture from the glide sheet.

SUMMARY OF THE DISCLOSURE

A patient transfer sheet is provided that includes a core panel having top and bottom surfaces with opposite end edges and opposite side edges, a length defined between the opposite end edges and a width defined between the opposite side edges. The length and width of the core panel is sized to receive at least the torso and upper legs of a patient lying thereon. The transfer sheet further comprises a side strip extending along each of the opposite side edges of the core panel, each side strip including a single sheet side panel having a length substantially equal to the length of the core panel. The single sheet side panel is folded twice along the length of the side panel to define four layers of the side panel. The side panel overlaps a side portion of the core panel adjacent a corresponding side edge of the core panel, with two abutting layers of the four layers disposed on each of the top and bottom surfaces of the core panel. Each of the four layers is affixed together and to the core panel by two parallel weld lines adjacent the side edge of the core panel and two parallel weld lines at a line intersecting the core panel inboard of the side edge of the core panel.

In another aspect, the patient transfer sheet comprises the core panel and a side strip extending along each of the opposite side edges of the core panel. Each side strip includes a plurality of layers overlapping the top and bottom surfaces of a side portion of the core panel. The patient transfer sheet includes plurality of handles along the length of each side strip. Each is defined by aligned openings cut through each of the plurality of layers and the side portion of the core panel. All of the plurality of layers are affixed together and to the core panel but are not affixed together or to the core panel at the aligned openings.

In a further aspect, the patient transfer sheet the single sheet of the core panel includes a repeating pattern of elongated indentations in the sheet that are spaced apart along a length of the pattern. Each indentation is oval-shaped and defines a long axis along a length thereof and a transverse axis along a transverse width thereof that is shorter than the length. The repeating pattern includes two parallel rows in which the elongated indentations alternate with the long axis and the transverse axis aligned along the length of the row. The two rows are offset relative to each other along the length of the pattern so that a long axis of an indentation in one row is aligned to intersect the short axis of an indentation in the other row. The single sheet side panel of the side strip also includes a repeating pattern of elongated indentations spaced apart along a length of the pattern. Each indentation is oval-shaped and the repeating pattern includes a first row in which the elongated indentations are aligned with the long axis at a non-perpendicular, non-colinear first angle relative to the length of the pattern, and a second row, parallel to the first row, in which the elongated indentations are aligned with the long axis at a non-perpendicular, non-colinear second angle relative to the length of said pattern that is different from the first angle. In one embodiment, the first angle is 45° and the second angle is 135°.

DETAILED DESCRIPTION

Figure 2:
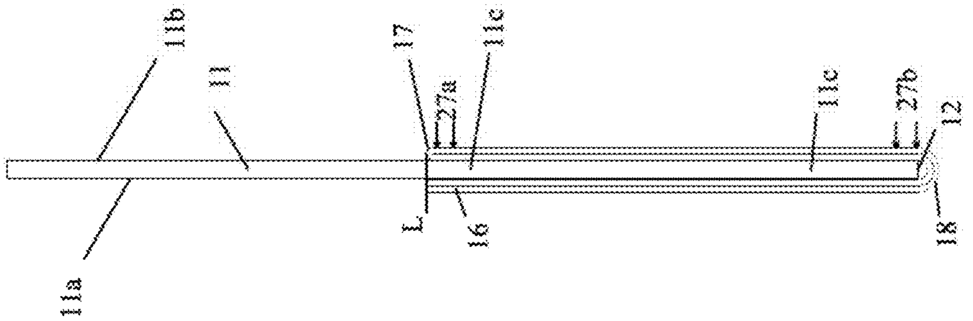
FIG. 2 is an end view of one side of the transfer sheet shown in FIG. 1, showing the construction of the side strip.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles disclosed herein as would normally occur to one skilled in the art to which this disclosure pertains.

Figure 1:
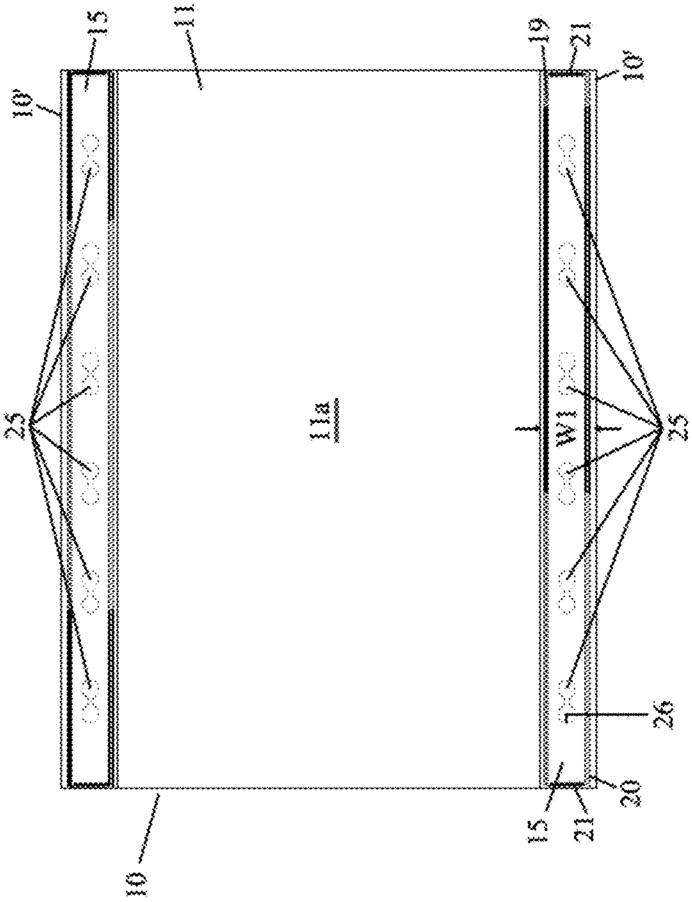
FIG. 1 is a top view of a patient positioning transfer sheet.

A transfer sheet 10 is provided with a core panel 11 and side strips 15 affixed to the side edges 12 of the panel, as shown in FIG. 1. The transfer sheet has an overall length and a width that is sized to cover a substantial portion of a patient bed. Preferably, the width is slightly greater than the width of the bed to allow for easy access to the handles 25 formed in the side strips 15, which are described in more detail herein. The length of the transfer sheet is preferably sufficient to receive the patient's torso and upper leg, and in one embodiment to extend from the neck to the knees of the patient. Thus, the overall length can be at least 39 inches, less than 72 inches, and preferably 56 inches. The width can be between 30 inches and 45 inches. Preferably, the transfer sheet can be provided in three distinct lengths—39, 56 and 72 inches—to accommodate different heights of patients.

The core panel 11 is a single sheet, preferably formed of a breathable non-woven material that does not inherently allow moisture or fluid, such as sweat and urine, to pass through the sheet. The material of the core panel 11 is very strong and rip-resistant since this sheet, together with the side strips 15, will be subject to significant shear forces when a patient is being moved by the transfer sheet 10. In one embodiment, the core panel 11 is single sheet of a non-woven polypropylene. The polypropylene can be a polymer with CAS Registry Number 9003-07-0. The sheet can have a thickness of 0.014-0.015 in. but is capable of moving a patient weighing 300 lbs. or more. The core panel 11 is configured so that the top surface 11*a* has a greater coefficient of friction than the bottom surface 11*b*. More specifically, the coefficient of friction (CoF) of the top surface 11*a* is the CoF of the non-woven material as provided—i.e., untreated. The bottom surface 11*b* of the core panel is provided with a low-friction coating that can serve two purposes—primarily to reduce the friction of the bottom surface of the transfer sheet and secondarily to prevent passage of fluids to the bedding below. In one embodiment, the coating is a polyethylene coating, and in a specific embodiment is a polyethylene coating with a CAS Registry Number of 9002-88-4. The low-friction coating allows the transfer sheet 10 to slide easily on the surface of the bed or bed linens. This reduces the force needed by the caregivers to move the patient along the bed, thereby reducing the risk of musculo-skeletal injury to the caregiver. In one embodiment, the top surface 11*a* can have a CoF per ASTM D1894-14 of 0.314, while the CoF of the bottom surface 11*b* can be 0.213. The greater CoF on the top surface 11*b* ensures that the patient will stay with the transfer sheet 10 during a repositioning or transfer process. The lesser CoF on the bottom surface 11*b* allows the transfer sheet 10 to slide on the bedding without excessive effort by medical personnel.

It is noted that in some embodiments, the top surface 11*a* can be provided with a hydrophobic coating. The coating can be polyethylene, but with a greater CoF than the polyethylene coating applied to the bottom surface 11*b*.

Figure 3:
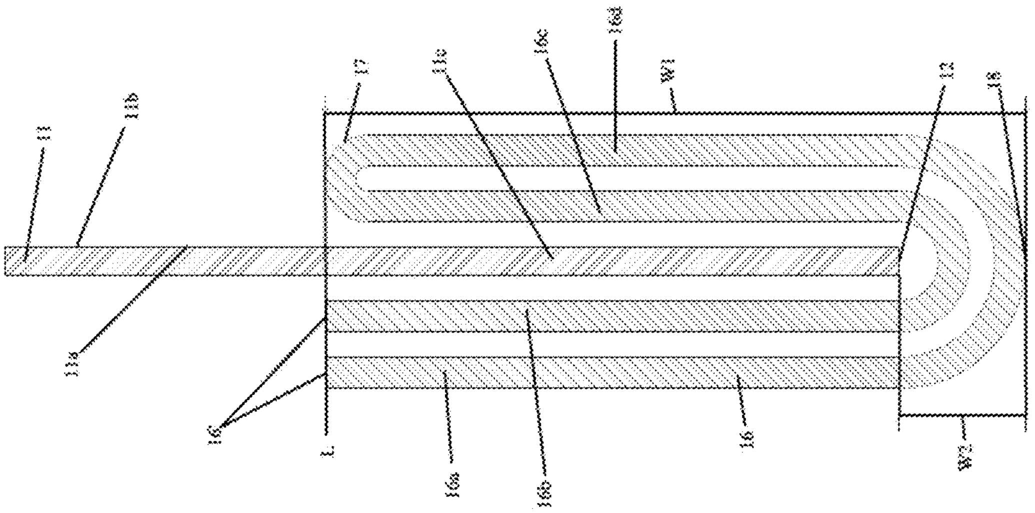
FIG. 3 is an enlarged view of the construction of the side strip shown in FIG. 2.

Details of each side strip 15 are shown in FIGS. 2-3. Each side strip 15 is formed by a single sheet side panel 16 that has a length substantially equal to the length of the core panel. The single sheet side panel is folded about the side edge 12 of the core panel 11. The side panel 16 is folded at a first fold 17 independent of the core panel, and then is folded about the side edge 12 at a second fold 18. The two folds thus produce overlapping layers 16*a*, 16*b* on one surface 11*a* (the top surface) of the core panel 11, and layers 16*c*, 16*d* on the opposite surface 11*b* (the bottom surface) of the core panel. It is appreciated that the side panel 16 is folded tightly against the surfaces 11*a*, 11*b* of a side portion 11*c* of the core panel adjacent the side edge 12, as depicted in FIG. 2. The side panel is shown loosely folded about side portion 11*c* in FIG. 3 for clarity. The side panel 16 is folded about the side edge 12 of the core panel so that the overlapping layers 16*a*-16*d* are uniformly overlapping to and abutting an interior line L intersecting the core panel. The width of the side portion 11*c* is thus defined between the side edge 12 and the interior line L. Thus, the fold 17 and the opposite edges 16' of the side panel 16 are substantially aligned with each other at the interior line L. It can be appreciated that the first fold 17 is offset from the midline of the width of the side panel 16, because the outer layers of the panel (16*a*, 16*d*) follow a larger radius at the second fold 18 than the inner layers of the panel (16*b*, 16*c*).

Figure 5:
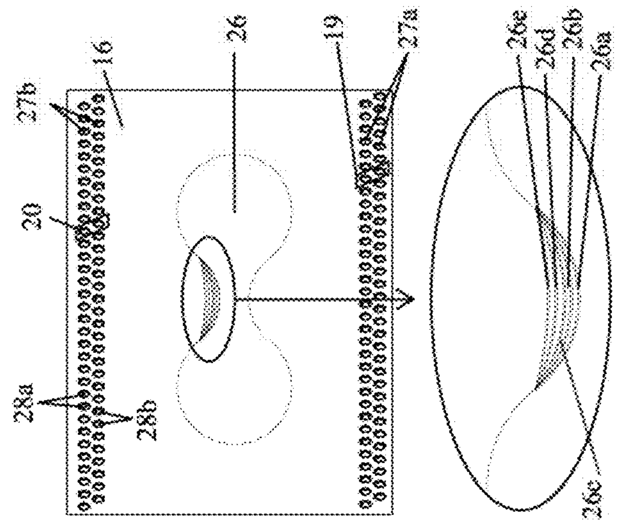
FIG. 5 is an enlarged view of the handle portion of the transfer sheet shown in FIG. 1.

A side panel 16 is, in effect, folded twice about each side edge 12 of the core panel 11. In producing the transfer sheet 10, it is contemplated that the first fold 17 of a side panel is made independent of the core panel 11. The folded side panel is then aligned with a side edge 12 of the core panel and then folded over the side edge to form the second fold 18. In an automated process, the core panel and the opposite side panels can be continuously fed while the first and second folds are made, after which the assembly of the core panel and two side panels can be continuously fed to a welding station where the panels are fixed together at the side strip. In particular, the layers 16*a*-16*d* and the core panel 11 are fixed by welding at inner and outer weld patterns 19, 20, respectively. The weld patterns extend the length of the side strip, as shown in FIGS. 1 and 5. The welding is preferably by ultrasonic welding, although other forms of welding, such as thermal welding, are contemplated. In one specific embodiment, two weld patterns 19, 20 pass through all five layers of the side strip and include a pair of parallel weld lines, as indicated by the arrows 27*a* and 27*b* in FIG. 2. The ultrasonic weld pattern is preferably a line of pill-shaped welds 28*a*, 28*b* in which the centers of the pull-shaped welds are spaced at about 5 mm apart along the length of the corresponding weld line 27*a*, 27*b*, as best seen in FIG. 5. The pair of weld lines of the two weld patterns are spaced about 1 cm apart. In one feature of the present transfer sheet, the pill-shaped welds 28*a* in weld line 27*b* are offset from the pill-shaped welds 28*b* in the weld line. In other words, a pill-shaped weld 28*b* is aligned with the gap between two adjacent welds 28*a*. A similar weld configuration is applied to the weld line 27*a* for the weld pattern 19. The outer weld pattern 20 is arranged so that both weld lines intersect the core panel 11 enveloped within the folded side panel 16.

The side strips also include end weld patterns 21 at the opposite lengthwise ends of the strips. In one embodiment, the end weld patterns 21 include three parallel weld lines, with the same pill shape and spacing as the weld lines 27*a*, 27*b*.

The side strip 16 has an overall width W1 from the interior line L to the outside of the second fold 18 and the second fold 18 of the side panel has a width W2 from the side edge 12 of the core panel to the outside of the second fold. The folded side panel thus overlaps the core panel by a width W1-W2. In one embodiment, the width W1=4.370 in. and the width W2=0.147 in., so that the overlapping layers 16*a*-16*d* overlap the core panel by a width of 4.370–0.147=4.223 in. In essence, the width W1 of the side strip is about ¼ of the width of the side panel before it is folded, and the amount of overlap of the core panel is that width W1 less the thickness of the two layers of the side panel 16. As described in further detail herein, the width of the side strip is sufficient for formation of the handles 25. The handles 25 are close enough to the lateral edges 10' of the transfer sheet so be easily grasped by the care-giver with the portion of the side strip between the handles and the lateral edge bunched in the hand of the care-giver. In one specific embodiment, the width W1 of the side strip is 4.25 in. and the centerline of the handles 25 is offset 2.25 in. from the lateral edge 10'.

In order for the transfer sheet to function properly to transfer or reposition a patient, the sheet must be placed on the bed with the low friction bottom surface 11*b* in contact with the bed linens. The transfer sheet is provided with a variable color scheme to facilitate immediate recognition of proper placement by the care-giver. In one embodiment, the core panel 11 is a non-white color. In a specific embodiment, the core panel can be a light green color, with the bottom surface 11*b* being a lighter shade of green than the top surface 11*a*. The side panel 16 is configured so that when the panel is folded as shown in FIG. 3, the first layer 16*a* is a darker green than the core panel top surface 11*a*. In other words, the first layer is a darker shade of the non-white color of the core panel top surface. The side panel is further configured so that at least the layer 16*d*, which overlaps the bottom surface 11*b* of the core panel, is white. The intermediate sheets 16*b* and 16*c* are also preferably white. With this configuration, the side panel 15 of the transfer sheet is dark green at the top surface 11*a* of the transfer sheet and white at the bottom surface 11*b* of the transfer sheet. The care-giver can immediately recognize which side of the transfer sheet 10 should be placed in contact with the bed/bed linens—i.e., which is the bottom of the transfer sheet—at a minimum by recognizing the white side strip 15 and perhaps secondarily by recognizing the lighter green of the bottom surface 11*b*. Alternatively, the care-giver can recognize the dark green side strip, and perhaps secondarily recognizing the different shade of green of the top surface 11*a*, to determine the side of the transfer sheet that should face up from the bed. In addition to providing an indicia for proper placement of the transfer sheet, the overall green color is easily distinguished from the traditional white hospital bed linens. This feature aids in proper positioning of the transfer sheet on the bed and reduces the risk of accidentally leaving a transfer sheet on the bed after use.

In another feature of the transfer sheet 10 is the provision of handles 25 integrated into the construction of the transfer sheet, and more particularly in the construction of the side strips 15. In one embodiment, the handles are in form of openings 26 having a “dog bone” shape, as disclosed in U.S. Pat. No. 8,281,436, which issued on Oct. 9, 2012 to the applicant of the present application, the entire disclosure of which is incorporated herein by reference. As disclosed in the ’436 patent, the dog bone shape of the openings 26 do not result in material stress points when the handles are grasped by the care-giver and pulled outward to move a patient laterally on a bed surface. The openings 26 deform to a substantially circular shape so that the tangential stress at the opening is uniformly distributed around the circumference of the now circular shape.

The openings 26 are formed by stamping the side strips at intervals along the length of the side strip, as shown in FIG. 1. In one embodiment, the openings are spaced apart by about 8.5 in. and six handles are provided on each side. The number and arrangement of the openings for the handles 25 allows the care-giver to select the most comfortable and efficient positioning of both hands when grasping and pulling the transfer sheet. The number of handles also allows two care-givers to grasp handles on the same side of the transfer sheet, if needed. In a specific embodiment, the dog bone openings 26 have a length of about 3.26 in. and a width of 1.32 in., which has been found to readily and comfortably accommodate a wide range of hand sizes of the care-givers.

Figure 4:
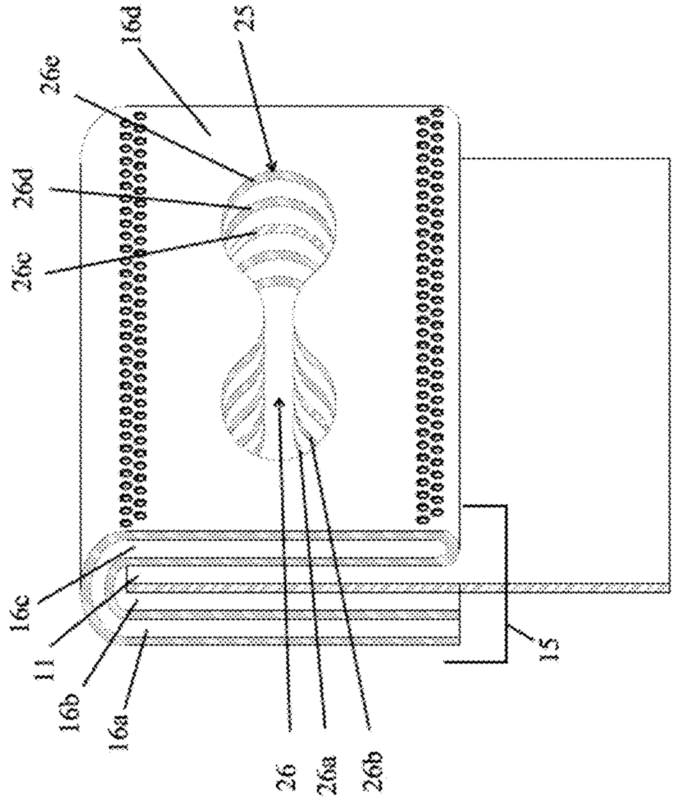
FIG. 4 is an exploded view of the side strip shown in FIG. 2 at a handle portion of the side strip.

One feature of the present disclosure is the construction of the handles 25, as shown in FIG. 4. As described above, the handles are formed by folding the side panel 16 around the edge 12 of the core panel so that the handle 26 is defined by multiple layers of material. In particular, in this embodiment, the handle is formed by five layers—4 layers of the side panel 16*a*-16*d* and the core panel 11. The opening 26 that forms the dog-bone handles passes through each of the layers forming openings 26*a*-26*e* through the five layers. In this feature, the layers are not sealed at the openings 26*a*-26*e*, as shown in FIG. 5. Leaving the openings 26*a*-26*e* unsealed makes the handles 25 more comfortable for the care-giver to grasp, regardless of the size of the user’s hands. Moreover, leaving the openings for the handles unsealed avoids the asymmetric strain that would be exerted on the layers if the openings were sealed together like the weld patterns 19, 20. With the layers unsealed, the force exerted by the care-giver at the openings is evenly distributed among each layer 26*a*-26*e*. In one specific embodiment, the layers have a thickness of about 0.0145 in. so the layers will easily conform to the palm of the care-giver’s hands when grasped and pulled.

As discussed above, the transfer sheet 10 is used to move a patient to a different position on the bed or to move the patient from the bed to a gurney, for instance. The patient is positioned in the center of the transfer sheet and the handles 25 are grasped by the care-giver and pulled toward one side of the bed to move the patient. In some cases, the integrity of the transfer sheet may have been compromised by bodily fluids so that the transfer sheet is less resistant to tearing from the shear forces being applied at the handles. In other cases, the patient is very heavy, 300 lbs. or more, so that the transfer sheet is under significant strain as the care-giver(s) pull the transfer sheet. In both cases, the transfer sheet can be susceptible to the formation of rips in the sheet which can render the transfer sheet unusable. In that instance, it would be necessary to undergo a lengthy process to remove the torn transfer sheet and provide a new transfer sheet with the patient on the new sheet.

Figure 6:
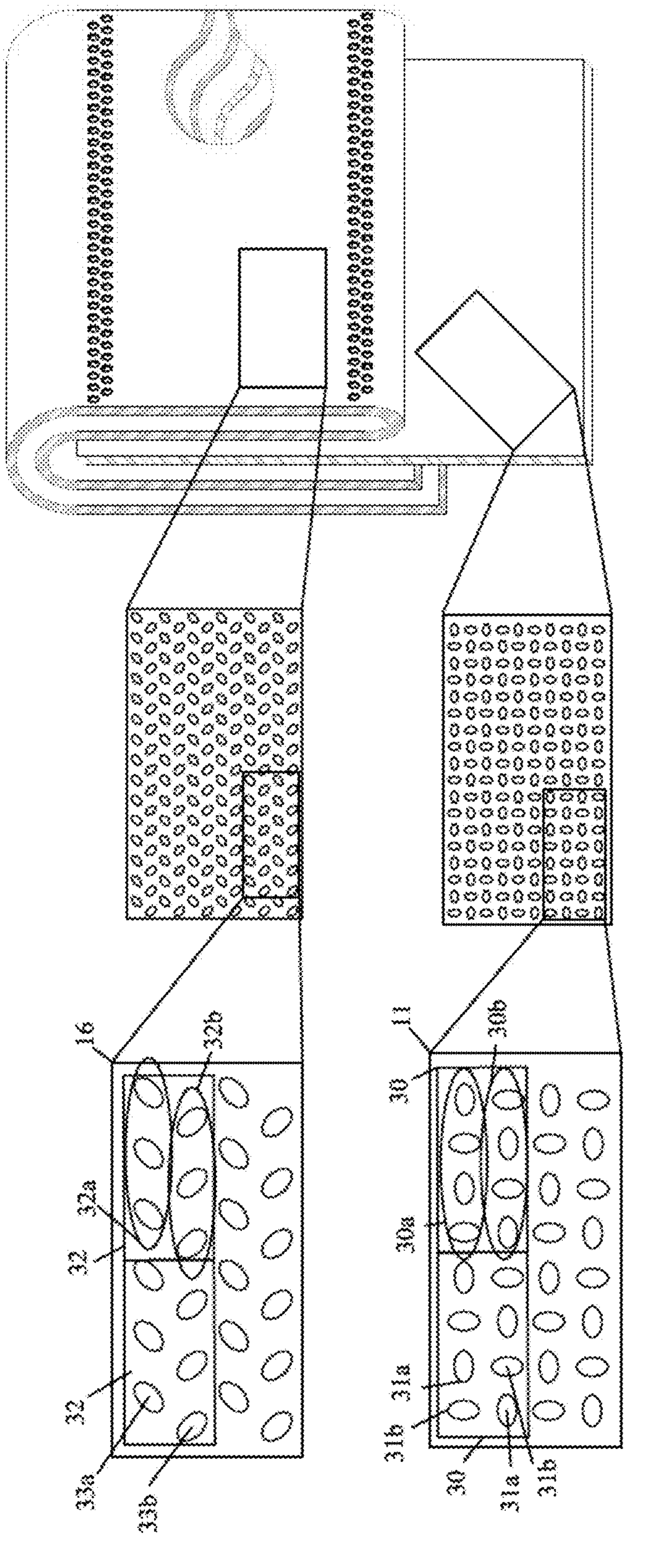
FIG. 6 is a diagram of indentation patterns formed on the core panel and the side panel of the transfer sheet of FIG. 1.

It is thus important that the transfer sheet have sufficient strength to move the heaviest without the fear of ripping the sheet. In one feature of the present transfer sheet, the core panel 11 and side panel 16 are formed with predetermined patterns of indentations in the panels. The indentations can be formed by stamping each panel or by stamping a continuous sheet of the panel material as it is manufactured. In one feature of the transfer sheet 10, the material of the core panel is stamped with a pattern 30 of indentations 31*a*, 31*b* shown in FIG. 6. (The patterns 30 are separated slightly more than in the final core panel for clarity). The indentations 31*a*, 31*b* are preferably in the form of elongated ovals so that the indentations do not include any sharp corners. The indentations thus have a long axis along the length of the oval and a transverse axis across the shorter width of the oval. Moreover, the indentations 31*a*, 31*b* are nominally of the same size. In a specific embodiment, the indentations are between 0.5-1.0 mm long with the width being about half the length. The indentations 31*a* are at right angles (90°) to the indentations 31*b* so that the long axis of indentation 31*a* is aligned with the short axis of an adjacent indentation 31*b*. As shown in FIG. 6, the indentations 31*a*, 31*b* alternate along a row 30*a* of indentations in the pattern 30—e.g., 31*a*, 31*b*, 31*a*, 31*b*, etc.—and are separated along the length of the row by about the width of each indentation. In a specific embodiment, the indentations in a row are separated by 0.25-0.5 mm. The adjacent row 30*b* switches the order so that an indentation 31*b* in row 30*a* is adjacent an indentation 31*b* in row 30*a*—e.g., 31*b*, 31*a*, 31*b*, 31*a*. The rows 30*a*, 30*b* alternate across the width of each pattern 30. The adjacent rows 30*a*, 30*b* are separated by about the width of each indentation. In a specific embodiment, the rows are separated by 0.25-0.5 mm. It can be appreciated that the pattern 30 is repeated across the entire width and length of the core panel 11.

In addition to providing a unique aesthetic to the core panel, the patterns 30 of indentations reduce the risk of rips or tears forming in the core panel when it is under load. The indentations do not include any sharp corners that might produce stress concentrations as the panel 11 is pulled to transport a patient. The alternation of the long-axis of the indentations 31*a*, 31*b* along any linear direction—i.e., side-to-side or top-to-bottom—provides the same strength improvement regardless of the direction that the transfer sheet 10 is pulled. Moreover, this alternation of long axis provides a rip-stop feature so that any tears that might develop are limited in length as the rip encounters different lengths of indentations. In addition, the 90° orientation of adjacent indentations 31*a*, 31*b* reduces the stretching of the core panel 11 as the transfer sheet 10 is pulled with a patient on the sheet.

The side panel 16 also includes a pattern 32 of indentations, as shown in FIG. 6, that is repeated across the length and width of each side panel. The indentations 33*a*, 33*b* are similar in configuration and size to the indentations 31*a*, 31*b*. However, the orientation of the indentations in each row 32*a*, 32*b* of the pattern 32 differs from the pattern 30. In particular, the indentations in each row are aligned at the same angle and do not alternate in orientation like the indentations 31*a*, 31*b* described above. In row 32*a*, the indentations 33*a* are oriented at a 45° angle to a line passing through the length of the row. In the adjacent row 32*b*, the indentations 33*b* are oriented perpendicular to the indentations 33*a*, or at a 135° angle to a line passing through the length of the row 32*b*, as depicted in FIG. 6. The row 32*b* is offset along its length from row 32*a* so that an indentation 33*b* in row 32*b* is aligned with the gap between successive indentations 33*a* in row 32*a*. Since the side panel 16 is folded into four layers at the side strip 15, the risk of tearing is inherently reduced relative to the core panel because the shear force is applied across five layers, rather than one. On the other hand, since the side strip 15 incorporates the handles 25 that are used to pull the transfer sheet the shear stress tends to concentrate at the handles. Ideally, the load at the two handles being grasped by the care-giver (or four handles if two care-givers are pulling the transfer sheet) is distributed across the length of the core panel 11 that is bearing the weight of the patient. The angled pattern of indentations 33*a*, 33*b* help direct the shear load outward from the handles 25 so that the shear stress is more evenly distributed along the length of the core panel 11. This feature reduces the risk of a shear concentration at certain points along the length of the core panel that might otherwise lead to a rip at those points.

The present disclosure should be considered as illustrative and not restrictive in character. It is understood that only certain embodiments have been presented and that all changes, modifications and further applications that come within the spirit of the disclosure are desired to be protected.

What is claimed is:

1. A patient transfer sheet, comprising:

a core panel having top and bottom surfaces with opposite end edges and opposite side edges, a length defined between said opposite end edges and a width defined between said opposite side edges, said length and width of said core panel sized to receive at least the torso and upper legs of a patient lying thereon;

a side strip extending along each of said opposite side edges of said core panel, each side strip including a single sheet side panel having a length substantially equal to the length of said core panel, said side panel folded twice along the length of the side panel to define four layers of said side panel, said side panel overlapping a side portion of said core panel adjacent a corresponding side edge of said core panel, with two abutting layers of said four layers disposed on each of said top and bottom surfaces of said core panel, wherein each of said four layers is affixed together and to said core panel.

2. The patient transfer sheet of claim 1, wherein:

said side panel defines a width transverse to said length with opposite edges;

said side panel is folded at a first fold offset from a midline in said width; and said side panel is folded at a second fold so that said opposite edges and said first fold are aligned with each other at a line intersecting said core panel inboard of a corresponding side edge of said core panel, said line and said side edge of said core panel defining said side portion.

3. The patient transfer sheet of claim 1, further comprising a plurality of handles, each defined by aligned openings cut through each of said four layers and said side portion of said core panel.

4. The patient transfer sheet of claim 1, wherein said four layers and said core panel are affixed by at least a pair of parallel weld lines in said side strip extending along the length of said core panel.

5. The patient transfer sheet of claim 4, wherein said four layers and said core panel are further affixed by a weld line across a width of said side strip at each of said opposite end edges of said core panel.

6. The patient transfer sheet of claim 5, wherein said four layers and said core panel are further affixed by three parallel weld lines across a width of said side strip at each of said opposite end edges of said core panel.

7. The patient transfer sheet of claim 4, wherein said four layers and said core panel are affixed by two parallel weld lines adjacent said side edge of said core panel and two parallel weld lines at a line intersecting said core panel inboard of said side edge of said core panel.

8. The patient transfer sheet of claim 7, wherein each of said two parallel weld lines includes pill-shaped welds, wherein the welds of one of said parallel weld lines are offset from the other of said parallel weld lines along the length of said two parallel weld lines.

9. The patient transfer sheet of claim 1, wherein said core panel is formed of a non-woven polypropylene.

10. A patient transfer sheet, comprising:

a core panel having top and bottom surfaces with opposite end edges and opposite side edges, a length defined between said opposite end edges and a width defined between said opposite side edges, said length and width of said core panel sized to receive at least the torso and upper legs of a patient lying thereon;

a side strip extending along each of said opposite side edges of said core panel, each side strip including a plurality of layers overlapping said top and bottom surfaces of a side portion of said core panel, wherein all of said plurality of layers are affixed together and to said core panel; and a plurality of handles, each defined by aligned openings cut through each of said plurality of layers and said side portion of said core panel, wherein said plurality of layers are not affixed together or to said core panel at said aligned openings.

11. The patient transfer sheet of claim 10, wherein said aligned openings are dog-bone shaped cut-outs.

12. The patient transfer sheet of claim 10, wherein said core panel and said side strip are formed of a non-woven polypropylene.

13. The patient transfer sheet of claim 12, wherein said bottom surface of said core panel includes a hydrophobic coating.

14. The patient transfer sheet of claim 12, wherein:

said side strip includes a top layer exposed at the top surface of said core panel, and a bottom layer exposed at the bottom surface of said core panel, said bottom layer of said side strip is white, said top layer is a non-white color, and said top and bottom surfaces of said core panel is a non-white color.

15. The patient transfer sheet of claim 14, wherein said top layer of said side strip is a darker shade of the non-white color of said core panel.

16. A patient transfer sheet, comprising:

a core panel in the form of a single sheet having top and bottom surfaces with opposite end edges and opposite side edges, a length defined between said opposite end edges and a width defined between said opposite side edges, said length and width of said core panel sized to receive at least the torso and upper legs of a patient lying thereon; and a separate side strip affixed along each of said opposite side edges of said core panel, each side strip defining a plurality of handles along the length thereof, each handle defined by an opening formed in said side strip, wherein said single sheet of said core panel includes a repeating pattern of elongated indentations in said sheet spaced apart along a length of said pattern, each indentation defining a long axis along a length thereof and a transverse axis along a transverse width thereof that is shorter than said indentation length, said repeating pattern including two parallel rows in which said elongated indentations alternate with the long axis and the transverse axis aligned along the length of the row, the two rows offset relative to each other along the length of said pattern so that a long axis of an indentation in one row is aligned to intersect the short axis of an indentation in the other row.

17. The patient transfer sheet of claim 16, wherein said indentations are oval-shaped.

18. The patient transfer sheet of claim 16, wherein said side strip includes a single sheet side panel that includes a repeating pattern of elongated indentations in said side panel spaced apart along a length of said pattern, each indentation defining a long axis along a length thereof and a transverse axis along a transverse width thereof that is shorter than said indentation length, said repeating pattern including a first row in which said elongated indentations are aligned with the long axis at a non-perpendicular, non-colinear first angle relative to the length of said pattern, and a second row, parallel to said first row, in which said elongated indentations are aligned with the long axis at a non-perpendicular, non-colinear second angle relative to the length of said pattern that is different from said first angle.

19. The patient transfer sheet of claim 18, wherein said first angle is 45° and said second angle is 135°.

20. The patient transfer sheet of claim 18, wherein the indentations in said side panel are spaced apart to define a space therebetween, and the first and second rows are aligned so that the indentation in one row is aligned with a space in the other row.

* * * * *